June 21, 1966  K. G. IZMIRIAN ETAL  3,256,955

DOCK FOR AIRCRAFT MAINTENANCE AND REPAIR

Filed Dec. 26, 1962  9 Sheets-Sheet 1

FIG.1

INVENTORS
KHACHATOOR GEORGIEVICH IZMIRIAN
LAZAR IOSIFOVICH IZRAETSKY
ANATOLY PETROVICH GOLOOBEV
FJODOR NICKOLAEVICH KOROLJOV
ISAK JAKOVLEVICH KOLODIN
LOODMILA ALEXANDROVN MIKHAILOVA
BY

June 21, 1966  K. G. IZMIRIAN ETAL  3,256,955
DOCK FOR AIRCRAFT MAINTENANCE AND REPAIR
Filed Dec. 26, 1962  9 Sheets-Sheet 5

FIG. 5

INVENTORS
KHACHATOOR GEORGIEVICH IZMIRIAN
LAZAR IOSIFOVICH IZRAETSKY
ANATOLY PETROVICH GOLOOBEV
FJODOR NICKOLAEVICH KOROLJOV
ISAK JAKOVLEVICH KOLODIN
LOODMILA ALEXANDROVN MIKHAILOVA
BY

United States Patent Office 3,256,955
Patented June 21, 1966

3,256,955
DOCK FOR AIRCRAFT MAINTENANCE AND REPAIR
Khachatoor Georgievich Izmirian, Leninsky prospect, 41, apt. 241; Lazar Iosifovich Izraetsky, Novye Cherjomooshki, kvartal 20–a, block 17, apt. 57; Anatoly Petrovich Goloobev, Prospect Mira, 19, apt. 36; Fjodor Nickolaevich Koroljov, Loogovaja, 1/28; Isak Jakovlevich Kolodin, Novye Cherjomooshki, kvartal 23, block 24, apt. 59; and Loodmila Alexandrovna Mikhailova, Serebrjany pereoolok, 5, apt. 19, all of Moscow, U.S.S.R.
Filed Dec. 26, 1962, Ser. No. 250,455
4 Claims. (Cl. 182—115)

The present invention relates to improvements in docks for maintenance and repair operations performed on aircraft.

Docks have been introduced in aircraft engineering in an attempt to facilitate maintenance and repair operations. Such docks are used in various countries of the world.

However, these attempts have proved to be unsatisfactory as the docks are below the requirements set forth by the user and repair shops in several respects.

The docks now in use are made of sections which are secured in a stationary position. This proves to be a great disadvantage as it limits the height of the sections to the distance between the lower surface of the aircraft wing and the ground level. Due to this fact the docks provide no means for arranging the operating positions at any height convenient for servicing and repair. Furthermore, the stationary sections present hinderance to the aircraft pulling in and out of the dock.

All known docks provide no access to the upper surfaces of the fuselage for purpose of maintenance and repair.

Among the disadvantages of the present docks is the absence of mechanical means for lifting and lowering various inner and outer equipment of the aircraft in the process of maintenance and repair operations.

The majority of all known docks are permanent unitary structures and are intended for repair of only one type of aircraft. The adaptation of a permanent unitary dock for another type of aircraft usually requires much labour and time.

In addition, many of the elements and units of the permanent unitary dock cannot be used if the dock is to be adapted for another type of aircraft.

It is also extremely difficult to transfer a permanent unitary dock to another place or location.

Attempts, however, unsuccessful, have been made heretofore to remove the above disadvantages.

With the present invention these disadvantages have been effectively overcome.

It has been discovered that a construction with easily removable sections will provide for an arrangement of service platforms at any height found most convenient for performing repair operations, since the service platforms, which have been limited by the level of the aircraft wing in the permanent unitary dock can be located at any section of the dock after the aircraft has been placed for repair.

To provide means for lifting and lowering the engines as well as other large assemblies of the aircraft, such as removable sections of the wing, stabilizer, fin, rudder, elevator, separate sections of the fuselage, etc., the dock is equipped with removable hoisting mechanism. This solves the problem of providing the necessary mechanical power for the fulfilment of individual repair or maintenance steps without employing any extra means such as auto cranes, electric cranes or other heavy equipment.

The upper outer surfaces of the aircraft fuselage have been made accessible through the installation of one or several arch bridges sliding on guide tracks which are laid along the whole length of the aircraft over the platforms arranged at one level in different sections of the dock.

The present invention overcomes the foregoing disadvantages as it solves the problem of providing mechanical power for lifting and lowering the aircraft outer and inner equipment by providing one or several hoisting apparatuses built into the dock sections.

The under-dock space and the platforms of the dock sections may be used as administrative, shop and storage areas. This permits maximum use of the dock space.

The dock may be erected outside the hangar, as it is furnished with a detachable cantilevered roof and removable wall panels, all of these being supported by the load-carrying elements of the dock.

The dock proper is also of detachable construction built up mostly of general-purpose units and parts. This is a very important feature of the invention as it saves much labour and time in adapting the dock for repair of various types of aircraft or in transferring the dock to some other location.

The main object of the present invention is to provide a dock for maintenance and repair which is adaptable for practically any type of aircraft with little labour needed for re-arranging its elements.

Another object of the invention is to provide an out-of-doors building construction which is a combination of a shelter for housing aircraft and of a servicing dock equipped with all necessary mechanisms to ensure proper fulfilment of the required operations.

Still another object of the present invention is to reduce to a minimum the time and costs in building constructions for aircraft servicing and repair and to provide all necessary areas for performing maintenance and repair operations.

A further object of the present invention is to provide access to all parts of the aircraft to be serviced or repaired, to provide area for accommodating the servicing personnel and for arranging their positions at any level over the platforms; this will ensure full safety during maintenance and repair operations excluding the need to use any service ladders or walkways.

A still further object of the invention is to ensure a portability of the dock construction which will make it possible to change the location of the dock with minimum time and labour and to transport the dock sections by any kind of transport.

One more object of the invention is to construct a dock for the most part of general-purpose parts and fittings.

The invention provides all means for an easy pulling-in or pulling-out of the aircraft as well as for ensuring the required maneuverability of the dock elements.

Furthermore, an object of the invention is to provide a mechanical hoisting and lowering mechanism for the aircraft equipment during aircraft disassembly, repair, maintenance operations or assembly.

It is also within the scope of the invention to ensure proper operating conditions for the personnel due to good natural light conditions created in the dock.

As is seen from the aforesaid, the invention is a dock intended for aircraft maintenance and repair, with load-carrying members used for supporting a cantilevered roof and wall panels when the dock is erected outside the hangar.

Other objects and advantages of the invention will become apparent upon reading the following description taken together with the appended drawings, in which.

The dock constructed in accordance with this invention for maintenance and repair operations performed on aircraft is a detachable construction composed of multiple multipair decks and platforms providing the dock proper and a roof disposed above them. The load-carrying elements of the dock serve also to support the roof and the walls.

The dock is intended for accommodating the maintenance crew on the platforms which are arranged at different levels found most convenient for performing maintenance operations. The dock ensures full safety for the crew during maintenance and repair operations and eliminates the need for special service ladders, walkways, etc.

The number of dock platforms and the levels at which they are located depend on the type of aircraft to be serviced or repaired in the dock. Consequently, overall dimensions of the dock are established for each separate case in accordance with the corresponding dimensions of the aircraft to be serviced and the required number of operating stations to be provided.

Furthermore, the dock proper is equipped with all mechanisms needed in dismantling and mounting aircraft accessories, units and parts and including large-size units; thus there is no necessity to provide any extra lifting mechanisms and appliances during operations performed on aircraft.

Figure 1:
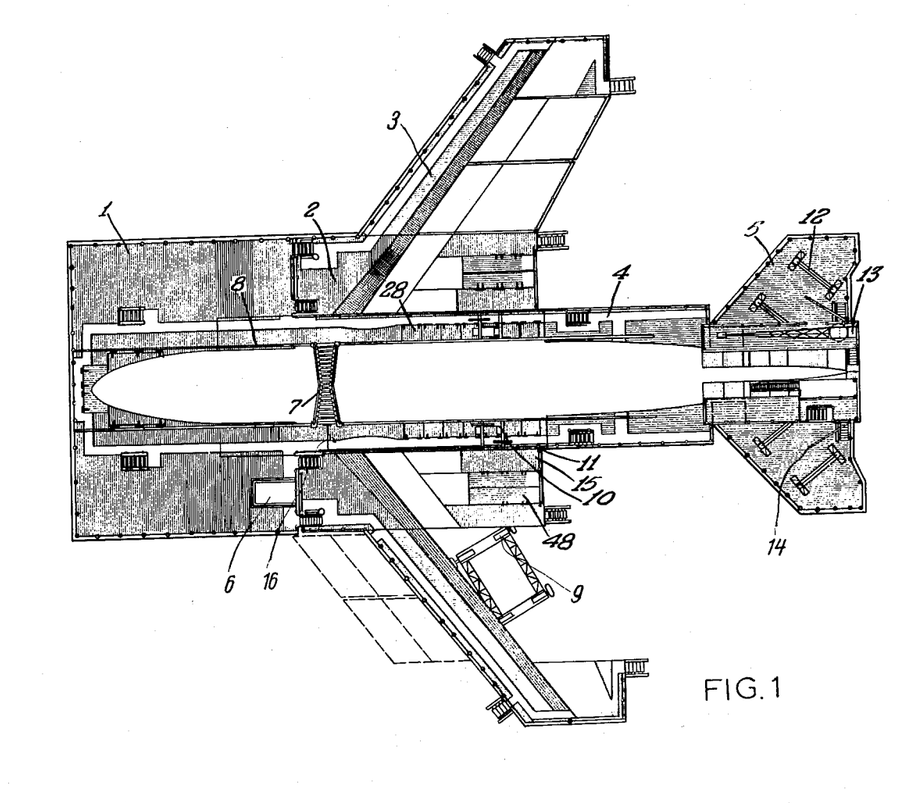
FIG. 1 is a plan view of the dock with the roofing removed.

The dock shown in FIG. 1 comprises the following: nose section 1, two middle sections 2, two wing sections 3, two fuselage rear sections 4, two tail sections 5, elevator 6 for lifting loads to the upper platform, bridge 7 sliding along guide tracks 8 along the fuselage, travelling platform 9 for wing disjointing or jointing operations, two winches 10 for aircraft power plants sliding along guide tracks 8 and 11, hoisting mechanisms 12 for mounting and dismantling the stabilizer, hoisting mechanism 13 with a jib crane for mounting and dismantling the fin with the rudder, lifting mechanism 14 for lifting and lowering elevators, two lifting platforms 15 for operations under the aircraft power plant, mechanism 16 for lifting and lowering power plant air intake scoops.

As shown in FIG. 1, section 1 of the dock structure is designed for servicing the fuselage nose and middle sections. It is given the name of the dock nose section and is shown in detail in FIG. 2. The nose section is a stationary non-detachable structure consisting of platforms which rest upon solid or tubular pillars 17, the platforms being secured at different levels above the ground. The pillars supporting the platforms constitute no obstacle to traffic under the dock. The pillars are mounted on shoes 18 secured to the floor with spikes or anchor bolts. Cast iron shoes are most preferable. The design of the pillars provides for their easy removal in case of necessity.

Figure 2:
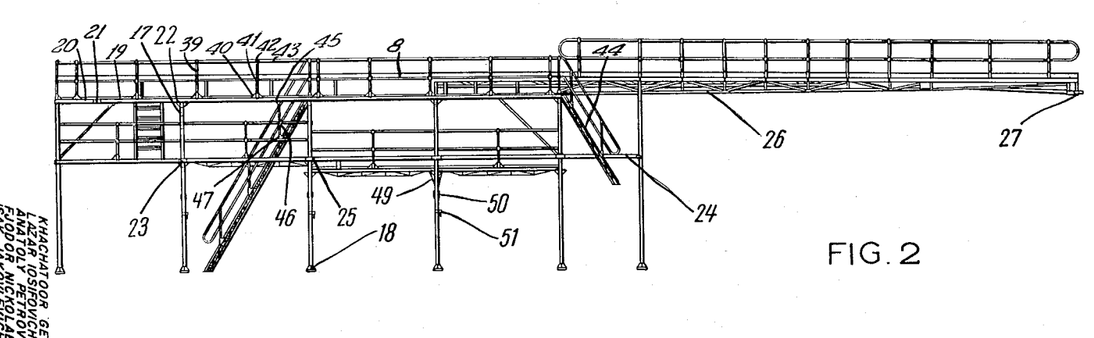
FIG. 2 is a side view of the dock stationary nose section of the dock.

The dock platforms are build up of flooring 19 attached to framework 20. A most convenient flooring is of wood.

Separate elements of the platform framework are jointed by means of connecting straps 21. To the upper ends of the pillars the platform framework is attached through supports 22. The framework of the mid-level platforms is attached to the pillars with the help of clamps 23. The section structure may be reinforced with braces 24 which are then fastened to the pillars with connecting plates 25. The section has two cantilever decks 26 arranged above the center main plane of the docked aircraft.

After the aircraft is housed, each centilever deck will be connected to the respective platform of fuselage rear section 4 as shown in FIG. 1, with the help of screw joint 27 shown in FIG. 2.

The cantilever decks of the section are provided with removable panels 28, FIG. 1, in the immediate proximity to the power plant in order to lift or to lower the power plant with the help of winches and to give access to the upper portion of the power plant in cases of necessity.

Guide tracks 8 are installed along the main platform of the nose section and along the cantilever decks to carry sliding bridge 7, FIG. 1, which facilitates the performance of maintenance and repair operations throughout the upper part of the fuselage from nose to fin.

The sliding bridge 7 is a rigid structure welded in the form of a bridge with steps to support the operators and to allow them to approach any point of the fuselage top. Due to its small weight the sliding bridge requires only a slight effort to shift it along the tracks 8. Brakes, not shown, are provided to fix the sliding bridge at any point above the fuselage.

The cantilever decks of nose section 1 carry guide tracks 11 handling for mechanical winches intended for power plants.

Elevator 6 shown in FIG. 1 connecting the upper platform with the underdock space is mounted in the place chosen as most convenient for its installation.

Figure 3:
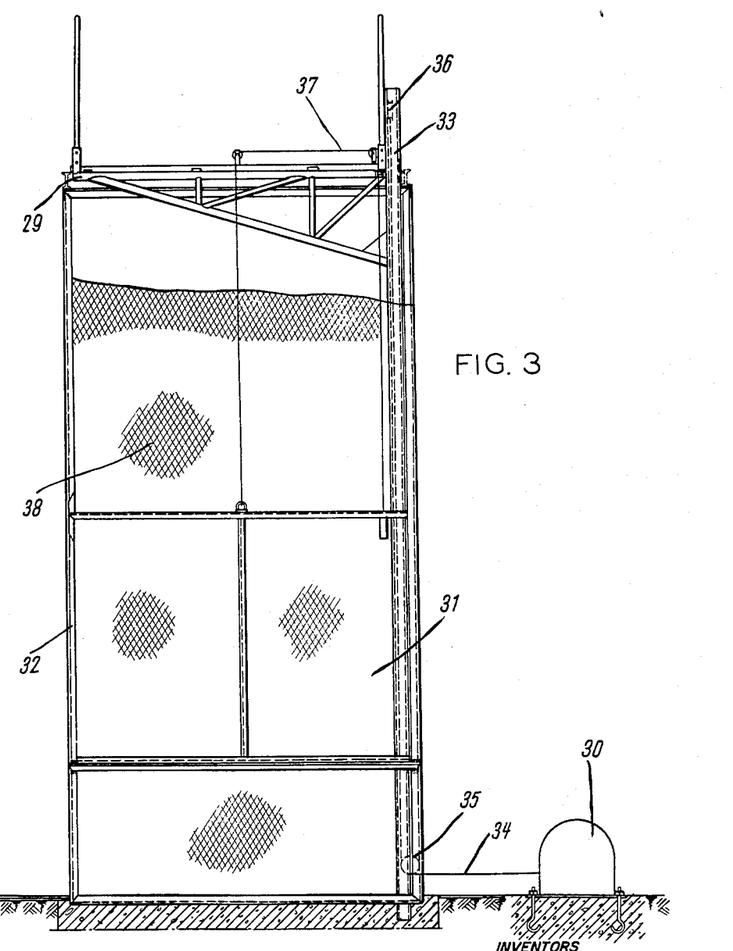
FIG. 3 is a view of the elevator used for lifting and lowering small-size loads, units and parts to the dock upper platform.

The elevator shown in FIG. 3 of a cantilever type comprises platform 29, elevator mechanism 30, self-opening door 31, and framework 32.

Cantilever lifting platform 29 slides up and down in framework 32 along two guide tracks 33. The platform is shifted upwards along the guide tracks by elevator mechanism 30 with the help of cables 34 and a system of pulleys 35 and 36. The loaded or unloaded platform slides down under its own weight.

Connected to the platform through cable 37 is the door 31 which opens when the platform reaches the ground floor and closes as soon as the platform starts upwards.

The elevator frame is protected with metal netting 38 or other suitable material and has an opening which is closed by the self-opening door 31.

The elevator platform may be stopped, if necessary, at any level to receive loads from any intermediate platform.

The cantilever decks of the dock nose section may be equipped also with hoisting mechanisms used for various purposes, e.g., for removal or installation of engine air intakes.

Along its whole perimeter dock nose section 1 is guarded with railings to prevent accidents. Railings 43 are fastened, through crosspieces 41 and heads 42, to posts 39 which are secured in heels 40 provided on the platform framework.

To ascend to the platforms from the ground floor and to interconnect the platforms, the dock nose section is provided with stairs 44 also guarded with railings, the railings being attached to the stair frame through heads 45, crosspieces 46, posts, and heels 47.

The available useful area constituted by the platforms and decks of all the sections may be used in a most suitable manner for choosing operators' stations, arranging all necessary equipment, for keeping the parts and units removed from the aircraft or to be installed in the aircraft.

The pillar number, design and arrangement chosen in accordance with permissable load calculations provide a wide lattitude for use of the inner space formed by platforms and decks and limited by the dock roofing and walls in a most advantageous way for providing separate rooms and offices for various needs which depends on the actual conditions encountered. The partitions separating the rooms may be made of any material e.g., plywoods, tarpaulin, glass, plastic; they may be easily attached to the dock pillars.

Figure 4:
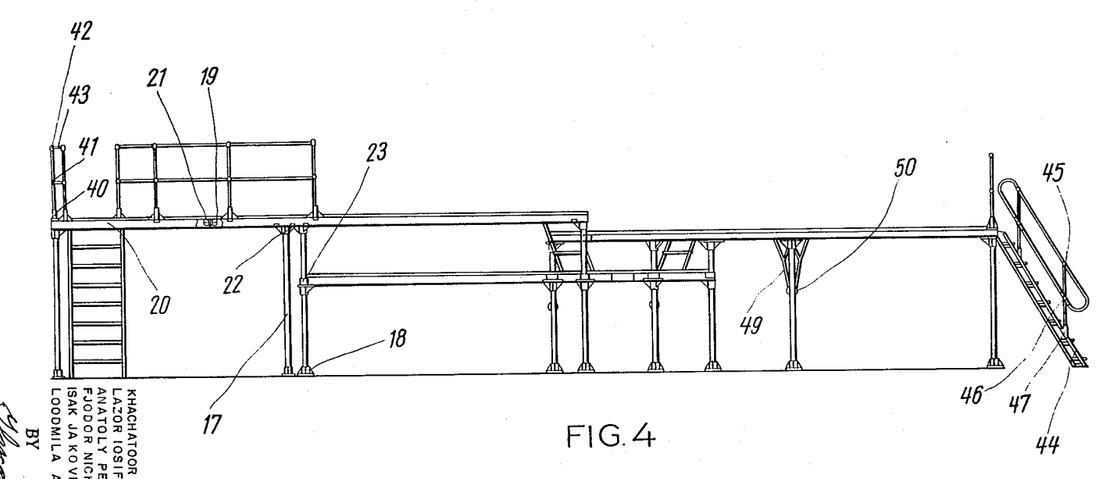
FIG. 4 is a side view of the stationary middle section of the dock.

Section 2 FIG. 1 of the dock is intended for servicing the middle sections of the fuselage and wing. The section is given the name of the dock middle section. The details of the section are shown in FIG. 4. The dock has a left and right stationary middle section.

All elements of the middle sections are similar to respective elements of the nose section, the sections being similarly composed of a number of elevated platforms supported on pillars.

The middle sections are secured to the floor through shoes 18 with spikes or anchor bolts.

In case the middle sections are erected on a well-levelled concrete site, the shoes of the pillars need not be fastened to the site with spikes or anchor bolts.

The middle section framework railings and stairs are similar to those described above in connection with the nose section of the dock.

Hinged panels 48 shown in FIG. 1 attached to platforms of the nose and middle sections may be dropped vertically down so as not to hinder the aircraft docking.

After the aircraft is properly positioned in the dock, the panels may be hinged up to rest upon turning brackets 49. The brackets are fixed in position on the pillars with locks 50.

The panels may be hinged up and down mechanically, i.e., with the help of hand winches 51 shown in FIG. 2.

Figure 5:
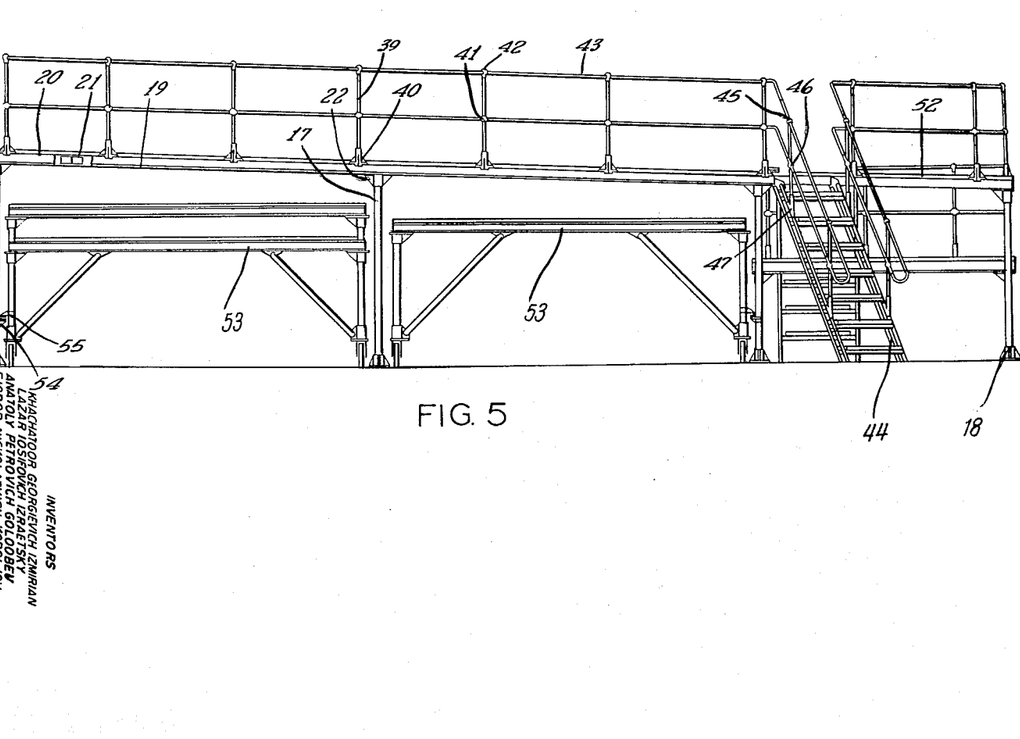
FIG. 5 is a front view of the dock stationary wing section with the movable platforms installed in place.

Section 3, shown in FIG. 1, is intended for servicing the aircraft outer wings. This section is given the name of the dock wing section. The details of the wing section are shown in FIG. 5. The dock has a left and right wing section. Each wing section is jointed to the respective middle section of the dock as is shown in FIG. 1.

The wing section consists of stationary parts 52 and movable parts 53. The structure elements and attachment units of the wing section stationary part are similar to respective elements and attachment units of the nose and middle sections, the elements being similarly numbered in the drawing. The railings and stairs are also quite analogous.

The movable parts of the wing sections are platforms on non-castering wheels.

The platforms have flooring on top.

The movable platforms 53 are used mainly for maintenance and repair operations pertaining to the lower surfaces of the aircraft outer wings.

To ensure a proper position of the movable platforms with respect to the stationary part of the dock wing section, guides 54 are mounted on the stationary part 52 to guide brackets 55 secured to the movable platforms 53.

In case a necessity arises to use traveling platform 9 shown in jointing and disjointing the wings the movable platforms 53 may be easily pushed forward to position them under the stationary part of the wing section as shown in dotted lines in FIG. 1.

Figure 6:
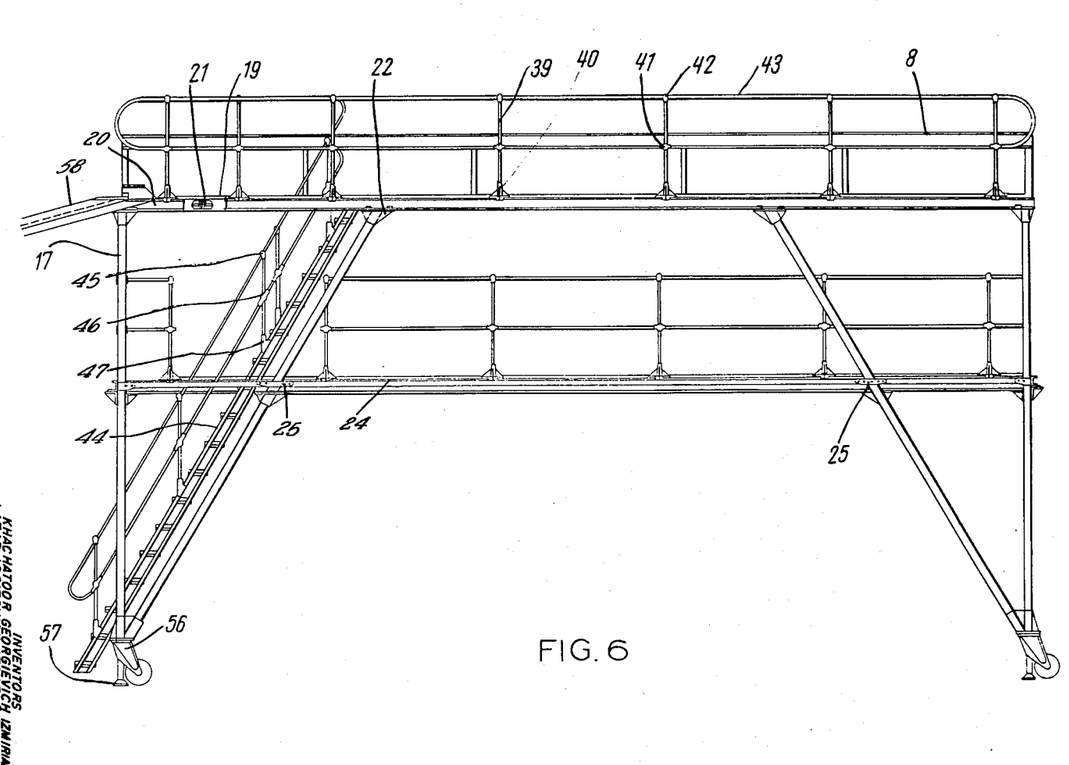
FIG. 6 is a side view of the movable rear section.

Section 4 of the dock as shown in FIG. 1 is intended for servicing the fuselage tail section; it is given the name of the dock rear section. The details of the section are shown in FIG. 6. The dock has a left and right rear section. Both sections are movable.

Each section consists of a number of platforms secured at different levels to a movable framework. The sections move on castering wheels 56.

The rear sections may be fixed in position by heels 57 mounted on the wheel brackets. To fix the section the heels must be screwed out until they rest upon the ground. The sections are provided with railings and stairs quite similar to those described above.

The front part of each rear section has guides 58 provided to engage and eliminate sagging of the nose section cantilever decks when the sections are jointed.

If necessary the rear sections may be provided with roofing and also with detachable wall panels.

Figure 7:
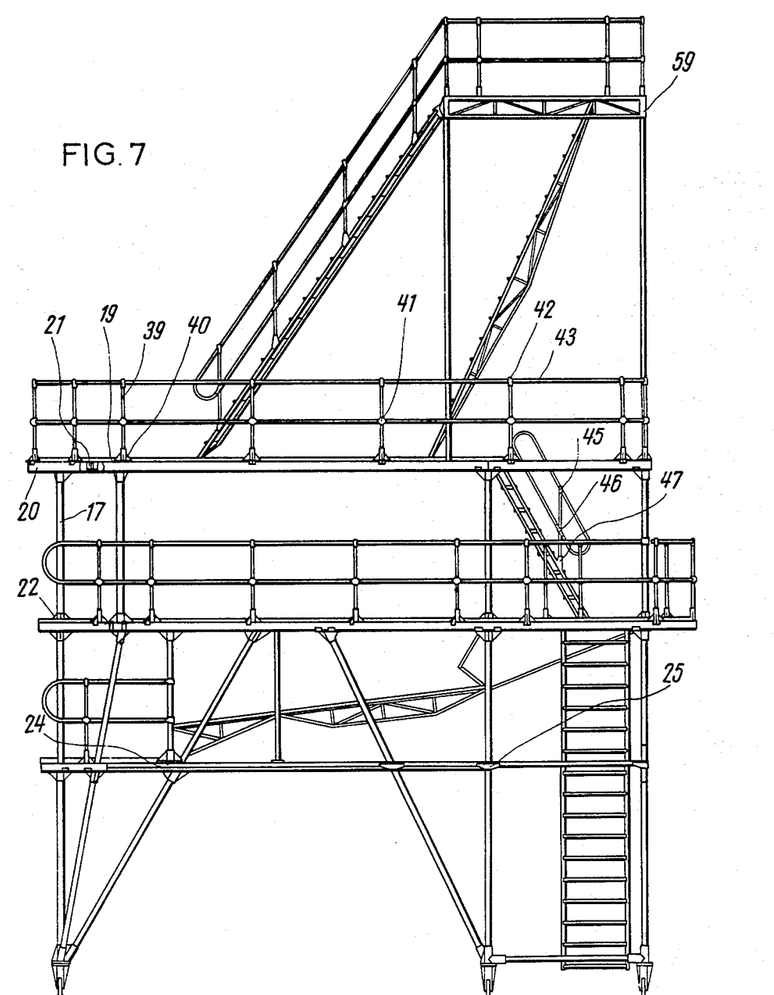
FIG. 7 is a side view of the movable tail section of the dock.

Section 5 of the dock shown in FIG. 1 is intended for maintenance and repair operations pertaining to the fuselage tail and empennage. The section is given the name of the tail section. The details of the tail section are shown in FIG. 7. The dock has a left and right tail section 5. Both sections are movable.

Each section comprises a number of platforms and decks located at different levels and secured to a movable framework. The section framework is mainly composed of parts and units similar to those building up the stationary sections of the dock.

The tail sections are made movable by providing castering wheels.

Thrust heels secured to the wheel brackets provide for fixing the tail sections in position over the site.

Stairs and railings of the tail sections are quite similar to those of other sections.

The left-hand tail section has superstructure 59, as shown in FIG. 7, intended for servicing the aircraft vertical surfaces. Stairs and railings are similar to those described above.

The superstructure for servicing the aircraft vertical surfaces may be executed in the form of a movable structure controlled directly from the superstructure service platform, for example.

Each tail section of the dock mounts special hoisting devices for removing and installing the stabilizer surfaces; these hoisting devices are also used for suspending the stabilizer when carrying out repair operations. The hoisting devices are driven mechanically, or preferably by a hydraulic drive.

The right-hand tail section mounts hoisting device 12 as shown in FIG. 1 with a jib crane and a lifting mechanism, such hoisting device being used in mounting and dismantling the aircraft fin with the rudder. Both tail sections are provided with hoisting devices 13 as shown in FIG. 1 for lifting the rudder to the platforms of the dock and for lowering it to the ground.

The tail sections are similar in their design to the rear sections of the dock, and they may be closed with roofing and wall panels if desired.

The roofing and panelling of the sections are quite simple in design and require minimum time and effort for erection.

However, the roof may be erected over the tail sections only after the removal of the aircraft fin and rudder assembly.

It should be pointed out that the roofing erected over the dock rear and tail sections in no way hinders operation of the hoisting devices provided in the sections.

The scope of the dock application may be still more widened due to the fact that it can be employed for maintenance and repair operations in the open or outside of hangars.

For thus purpose the dock is furnished with a detachable cantilevered roof and wall panels, all of them supported by the load-carrying elements of the dock proper.

Figure 8:
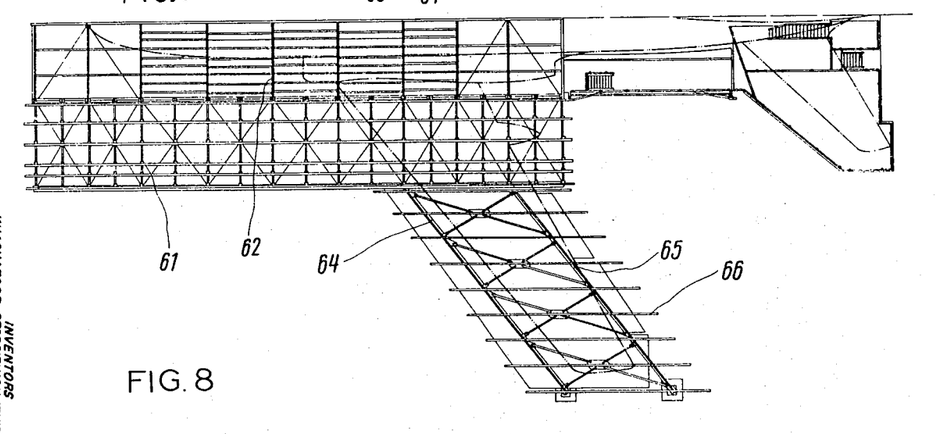
FIG. 8 is a plan view of the dock roof.
Figure 9:
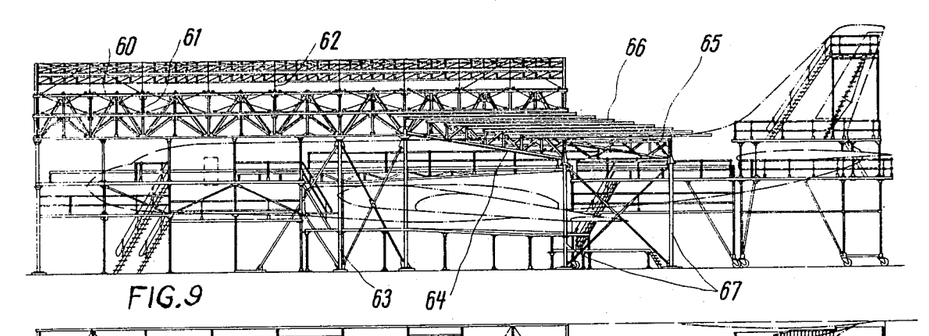
FIG. 9 is a side elevational view of the dock roof and roof supporting members.

The roof framing is made of longitudinal truss members 60, as shown in FIG. 9, lateral truss members 61 and 62 as shown in FIGS. 8 and 9, and forming the arc over the aircraft under repair and the slope over the side platforms.

The roof rests on a certain number of pillars 63 reinforced for the purpose and forming part of the dock-carrying pillars.

Various building materials such as corrugated steel or aluminum alloy sheets, 0.8–1.0 mm. thick, for example, may be employed for roofing.

Most preferably as roofing materials are transparent plastics improving light conditions inside the dock.

The framing of the roof carried by the wing sections of the dock consists of two parallel truss members 64 and 65 arranged along the wing span and section bars 66 bracing the roof frame in the longitudinal direction.

The roof of the wing section rests upon cantilever trusses 60 of the wing section above-fuselage part and two pillars 67 located at the wing tip. In its shape the wing section roof is a flat panel forming an extension of the fuselage roof.

The roofing material is the same as used for the fuselage part of the dock roof.

The walls of the dock erected outside the hangar consist of upper, middle, and lower rows of wall panels. The panels are made of sheet metal secured to a frame which is built up of section bars. The panels are supported by the outer rows of the dock-carrying pillars.

For improving light conditions inside the dock, the wall panels may be provided with window panes.

The wall panels are heat-insulated on the inside and are lined with a non-metal material.

Wall panels are not employed for the rear sides facing the aircraft tail of the dock wing and middle sections, these sides being closed in all cases either with light gates sliding along guide tracks or with curtains, or in some other way providing for ease of rear side removal and installation.

Provision is made for maintaining normal air temperatures inside the dock when located outside the hangar by employing steam-air or fuel-air heaters. The heated air supplied to the dock can be fed along pipes to any point of the dock. With the help of these air heaters the problems of air conditioning and of maintaining normal operating temperature conditions inside the dock have been solved quite satisfactorily.

The ventilation is natural.

All power supply wiring and switchgear are arranged in the dock.

In order to pull the aircraft into the dock, the rear and tail sections of the dock must be wheeled aside to form a mouth not less than the aircraft wing span in width. The aircraft is then pulled into the dock by employing the power of a truck or some pulling mechanism such as electro-mechanical winch, for example, the tow cable being secured to the aircraft nose landing gear axle. The rear and tail sections of the dock are wheeled to their original places as soon as the aircraft is properly positioned in the dock.

Figure 10:
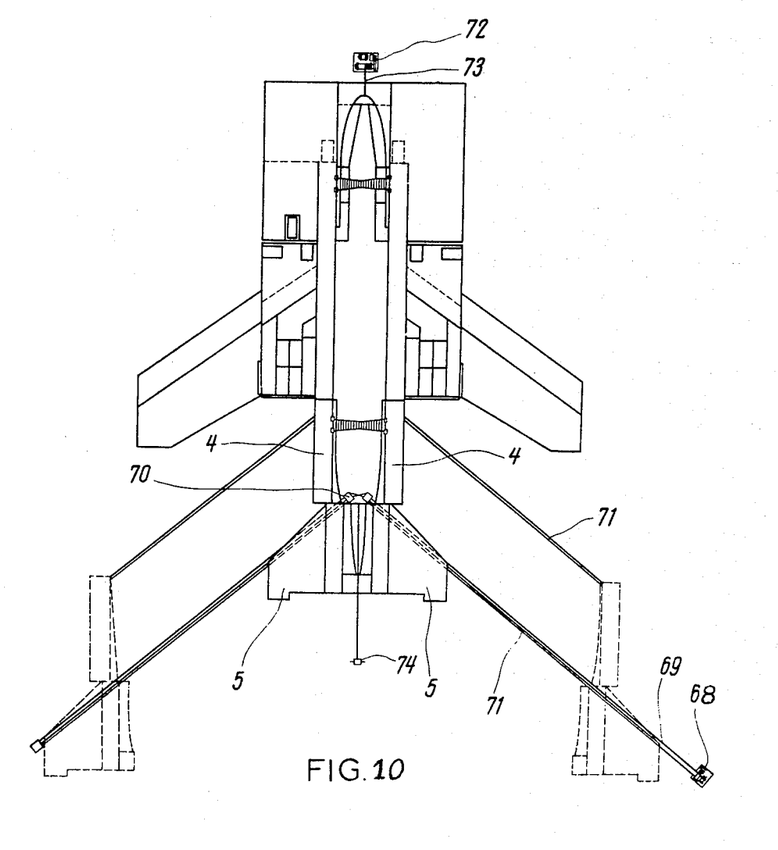
FIG. 10 is a schematic diagram showing means for docking the aircraft and for moving aside the rear tail sections.

If desired mechanical power may be used for moving the rear and tail sections of the dock. Presented in FIG. 10 is the employment of electro-mechanical winches 72 and 68 both for pulling in the aircraft and for moving the dock rear and tail sections.

To begin the procedure, winch 68 connected through cables 69 and pulleys 70 to the tail 4 and rear 5 sections of the dock is started.

With the winch drum rotating, the pulling effort transmitted through cables 69 moves the dock sections along guides 71. The movement of the dock sections is shown in FIG. 9 in dotted lines.

Winch 72 serves to pull the aircraft into the dock, or out of the dock, as need be, with the help of cable 73 running over pulley 74.

After the pulling-in of the aircraft or pulling-out is completed, winch 68 will be started again to move the rear and tail sections to their proper position in the dock, and thus to complete the procedure.

The winch electric circuits provide for a synchronization of winches within the required time intervals. With the aircraft and movable sections of the dock in extreme positions, the winches are automatically cut out with the help of limit switches.

It will be obvious to those skilled in the art that various changes may be made in the invention without departing from the spirit and scope thereof, and therefore the invention is not limited by that which is shown in the drawings and specification, but only as indicated in the appended claims.

What we claim is:

1. A dock structure for facilitating simultaneous maintenance and repair of an entire aircraft, said dock structure comprising a nose section having a generally U-shaped opening therein for receiving the nose portion of an aircraft with the legs of said nose section defining said opening disposed along opposite sides of said nose portion in close proximity thereto, said opening substantially conforming to the contour of said nose portion, said nose section being fixed in position and having working platforms thereon, a pair of spaced middle sections disposed respectively substantially in alignment with and abutting the legs of said nose section to receive the middle portion of said aircraft therebetween with said middle sections disposed in close proximity to opposite sides of said middle portion, said middle sections being fixed in position and having working platforms thereon forming a continuation of the platforms on said nose section, a pair of wing sections disposed adjacent and abutting said middle sections and extending outwardly therefrom substantially in alignment with the wings of the aircraft, said wing sections being fixed in position and having working platforms thereon forming a continuation of the platforms on said middle sections, a pair of spaced rear sections disposed respectively substantially in alignment with and abutting said middle sections to receive the rear portion of the aircraft forward of the tail portion therebetween with said rear sections disposed in close proximity to opposite sides of said rear portion, said rear sections being movable generally transversely of the aircraft into and out of operative position and having working platforms thereon forming a continuation of the platforms on said middle sections when said rear sections are in operative position, a pair of tail sections disposed respectively substantially in alignment with and abutting said rear sections to receive the tail portion of the aircraft therebetween, said tail sections having portions extending outwardly therefrom, substantially in alignment with the tail surfaces of the aircraft, said tail sections being movable generally transversely of the aircraft into and out of operative position and having working platforms thereon forming a continuation of the platforms on said rear sections when said tail sections are in operative position, the movement of said rear and tail sections being sufficient to clear the wings when moving an aircraft into and out of the dock, stairways connected to the platforms on at least certain of said sections, all of said sections being constructed of detachable units, thereby facilitating assembly and disassembly, and at least certain of said sections having cantilever portions for disposition over and above the aircraft.

2. A dock structure as defined in claim 1, in which said wing sections are additionally provided with platforms movable transversely of the working platform on said wing section.

3. A dock structure as defined in claim 1, in which elevator means and hoisting means are provided on at least certain of the sections to facilitate handling of equipment and materials.

4. A dock structure as defined in claim 1, in which a roof and side panels are provided for enclosing the dock, said roof and side panels being attached to and supported solely by the sections.

(References on following page)

References Cited by the Examiner

UNITED STATES PATENTS

| | | | |
|---|---|---|---|
| 1,361,828 | 12/1920 | Clowes | 182—130 |
| 2,203,113 | 6/1940 | Uecker | 182—129 |
| 2,337,674 | 12/1943 | Miller | 182—36 |
| 2,354,905 | 8/1944 | Bailey | 182—132 |
| 2,744,581 | 5/1956 | Cooper | 189—1.5 |
| 2,798,574 | 7/1957 | Wardell | 189—129 |
| 2,828,166 | 3/1958 | Herring | 182—131 |
| 2,985,253 | 5/1961 | Hollingsworth | 182—132 |
| 3,034,607 | 5/1962 | Haines | 189—1.5 |

FOREIGN PATENTS 589,443  6/1947  Great Britain.

HARRISON R. MOSELEY, *Primary Examiner.*

REINALDO P. MACHADO, *Examiner.*